United States Patent [19]

Schönleber

[11] Patent Number: 5,116,092
[45] Date of Patent: May 26, 1992

[54] BUMPER ARRANGEMENT FOR MOTOR VEHICLES, PARTICULARLY PASSENGER CARS

[75] Inventor: Gerhard Schönleber, Munich, Fed. Rep. of Germany

[73] Assignee: Bayerische Motoren Werke AG, Fed. Rep. of Germany

[21] Appl. No.: 663,820

[22] PCT Filed: Sep. 23, 1989

[86] PCT No.: PCT/EP89/01110
§ 371 Date: Mar. 20, 1991
§ 102(e) Date: Mar. 20, 1991

[87] PCT Pub. No.: WO89/07465
PCT Pub. Date: Aug. 24, 1989

[30] Foreign Application Priority Data

Sep. 29, 1988 [DE] Fed. Rep. of Germany ....... 3833048

[51] Int. Cl.⁵ .............................................. B60R 19/06
[52] U.S. Cl. ..................................... 293/132; 293/133
[58] Field of Search ............... 293/133, 132, 120; 188/376, 378

[56] References Cited

U.S. PATENT DOCUMENTS

| 3,428,150 | 2/1969 | Muspratt | 188/376 |
| 3,608,677 | 9/1971 | Wykes | 188/376 |
| 3,663,048 | 5/1972 | Zimmerle | 293/132 |
| 3,887,223 | 6/1975 | Bez | 293/132 |

FOREIGN PATENT DOCUMENTS

| 0055364 | 7/1984 | European Pat. Off. |
| 7129356 | 11/1973 | Fed. Rep. of Germany |
| 2262293 | 6/1974 | Fed. Rep. of Germany |
| 2509351 | 9/1975 | Fed. Rep. of Germany |
| 2441557 | 3/1976 | Fed. Rep. of Germany |
| 3626150 | 2/1988 | Fed. Rep. of Germany |
| 2464871 | 3/1981 | France |
| 62-17438 | 6/1987 | Japan |
| 2020780 | 11/1979 | United Kingdom |
| 2134211 | 8/1984 | United Kingdom |
| 2152181 | 7/1985 | United Kingdom |

OTHER PUBLICATIONS

Energy Absorption of Glass Polyester Structures, Paul A. Kirsch & Herbert A. Jahnle, 1981.
Emergy Absorption in Composite Tubes, P. H. Thornton & P. T. Edwards, 1982.
Crash Energy Absorption Properties of Composite Structure Elements, D. C. Bannerman & C. M. Kindervater, 1983.
Impact Response of Structural Composites, D. Hull, pp. 35-38, Jan. 1985.

Primary Examiner—Robert R. Song
Attorney, Agent, or Firm—Evenson, Wands, Edwards, Lenahan & McKeown

[57] ABSTRACT

A bumper arrangement for motor vehicles, particularly passenger cars, having a bumper which is held on the vehicle body by flexible fastening devices. Impact absorbing tubes are arranged between the vehicle body and the bumper which cannot regenerate, and consist of at least one fiber composite, the fibers of which are at least essentially arranged in the longitudinal direction of the tube.

20 Claims, 6 Drawing Sheets

BUMPER ARRANGEMENT FOR MOTOR VEHICLES, PARTICULARLY PASSENGER CARS

BACKGROUND AND SUMMARY OF THE INVENTION

A bumper arrangement for motor vehicles, particularly passenger cars, having a bumper and flexible fastening devices by which the bumper is held on the vehicle body at a changeable distance from the vehicle body. In the case of distance changes in a first distance area, the flexible fastening devices can essentially regenerate. The bumper arrangement has impact absorbing tubes which act as supporting devices in the event of distance reductions in a second area which is closer to the vehicle body than the first distance area. In the event of a pressure load in the longitudinal direction of the tubes, the tubes act as supporting devices while being essentially unable to regenerate while the tube wall is destroyed on the tube end side and the tube wall material is deflected in the transverse direction.

A bumper arrangement of the above-described type is known from the German Patent Document DE-A 24 41 557 (FIGS. 6, 8), in which hydraulic shock absorbers are provided as flexible fastening devices. The cylinder housing of each shock absorber fastened to the vehicle body forms an impact absorbing tube which, in the case of a further pushing-together of the cylinder housing and the piston rod in the second distance area from the piston rod closer to the vehicle body which exceeds the flexible compression in the first distance area farther removed from the vehicle body, can be expanded by means of a projection existing on the piston rod. So that the cylinder housing will tear open in a defined manner when the projection is pressed in, the cylinder housing may be provided with longitudinal notches. The strips of the cylinder housing wall, which form during the expanding, are deflected in the radial direction toward the outside by the projection on the piston rod and roll up spirally similar to metal shavings during a cutting operation so that the cylinder housing opens up radially from the direction of its bumper-side end. The site of the expansion shifts in the longitudinal direction of the cylinder housing, and the expansion takes place on the respective, momentarily existing end of the cylinder housing which shortens corresponding to the progression of the expanding. The length along which the expanding takes place is a function of the extent of the effective kinetic energy and of the structural design of the bumper arrangement and its arrangement on the vehicle body which, in a holding manner, reaches around the body-side area of the cylinder housing and counteracts an expansion of this area of the cylinder housing. In the case of an impact, the bumper arrangement can elastically absorb the kinetic energy up to a first threshold value, for example, of an impact speed of 8 km/h, and can regenerate automatically after the impact. At higher impact speeds, the bumper arrangement can absorb the kinetic energy no longer only elastically but, up to a second threshold value, for example, of an impact speed of 15 km/h, while the impact absorbing tubes are destroyed which are plastically deformed. In the case of impact speeds up to the second threshold value, the vehicle body protected by the bumper arrangement is therefore not damaged.

It is an object of the invention to provide a bumper arrangement which may have small dimensions, particularly a small overhang in the driving direction and a low weight and, in addition, after a destruction of the impact absorbing elements which took place in the second distance area, can be restored at low expenditures in an operationally appropriate manner.

This and other objects are achieved by the present invention which provides a bumper arrangement for a motor vehicle having a vehicle body, comprising a bumper, at least one fastening device by which the bumper is held on the vehicle body at a changeable distance, and which can essentially regenerate after the distance changes within a first distance area, and impact absorbing tubes. The impact absorbing tubes act as supporting devices for distance changes within a second distance area that is nearer to the vehicle body than the first distance area. In the event of a pressure load in a longitudinal direction of the tube, the impact absorbing tubes act as supporting devices and are unable to regenerate. The impact absorbing tubes having tube walls, these tube walls being destroyed on a tube end side in the event of a pressure load and the material of the tube wall being deflected in a transverse direction. The impact absorbing tubes are parts separate from the at least one fastening device and consist of at least one fiber composite, with fibers of the fiber composite arranged at least essentially in the longitudinal direction of the tube. As a result of the present invention, an effective energy absorption is achieved by means of simple devices while using low-cost components. The bumper arrangement according to the invention permits a liberal design, particularly also of its components, can be easily mounted during the manufacturing of the motor vehicle and is easy to repair. It requires little space and can easily be adapted to varying requirements by the use of correspondingly designed components. In addition, it is not very susceptible to disturbances, and its impact absorbing tubes are not endangered by corrosion.

The impact absorbing tubes can easily be manufactured at low cost. It is particularly advantageous to manufacture the impact absorbing tubes by the cutting of extruded tube sections into lengths.

It is particularly advantageous to use spring elements as flexible fastening devices which essentially have a ring shape and also consist of at least one fiber composite. Spring elements of this type, which are loaded in the transverse direction and which, at a low load, have an elastic effect and can regenerate, and, at a higher load, like the impact absorbing tubes, act as impact absorbing elements while being destroyed and can essentially not regenerate. Such spring elements are known from the German Patent Document DE-OS 36 26 150. By means of the parallel arrangement of the spring elements and of the impact absorbing tubes, a particularly favorable energy absorption is obtained.

The arrangement of an impact absorbing tube or several impact absorbing tubes in a spring element results in a compact construction.

Although it is known from the European Patent Document EP-PS 55 364 to manufacture an impact protection component for the support of a motor vehicle bumper as a tube from at least one fiber composite, the tube wall is constructed as a network. The tube is used as an elastic (reversible) support in the case of low pressure loads in the longitudinal direction of the tube, and in the case of higher loads, irreversibly absorbs energy while permanently deforming, and is therefore used for the flexible support as well as as an impact absorbing tube.

Other objects, advantages and novel features of the present invention will become apparent from the following detailed description of the invention when considered in conjunction with the accompanying drawings.

BRIEF DESCRIPTION OF THE DRAWINGS

The drawing is a schematic view of embodiments of the invention.

DETAILED DESCRIPTION OF THE DRAWINGS

Figure 1:
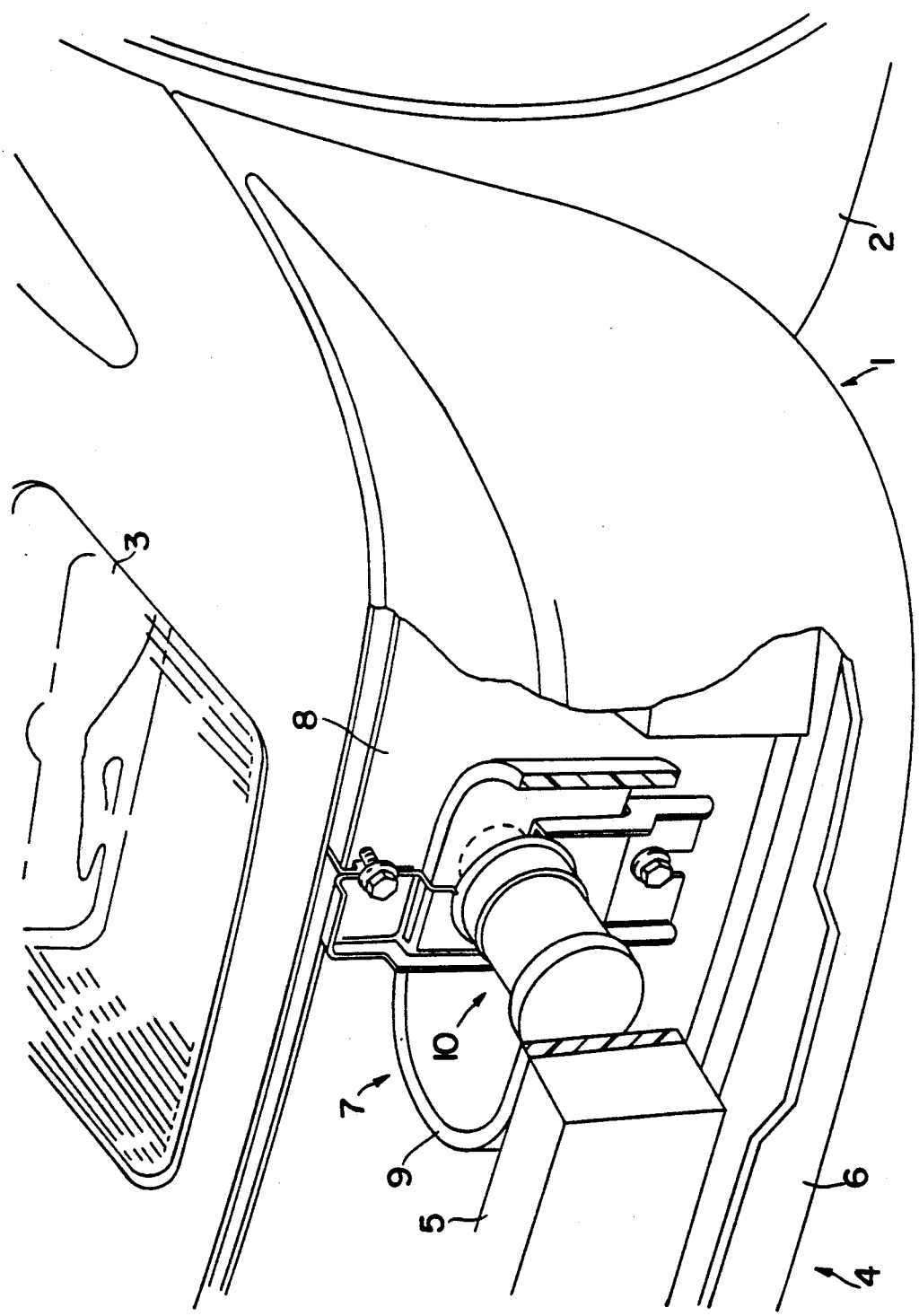
FIG. 1 is a view of a passenger car with partially cutaway parts.

According to FIG. 1, a sporty two-seat passenger car 1 having a left front wheel 2 and a left headlight 3, at its forward end, has an only partially shown front bumper arrangement 4 with a horizontal bumper 5 extending essentially transversely to the longitudinal direction of the vehicle and being provided with a bumper covering 6. The bumper 5 is fastened to the vehicle body 8 by means of a left and a right bumper holding device 7 of which only the left one is shown. The bumper holding device 7 is formed by a spring element 9 which is designed as an essentially oval ring with a vertical axis and consists of a fiber-reinforced plastic material. On the one side, this spring element 9 is fastened to the bumper 5 and, on the other side, to the vehicle body 8, for example, to a side member of the vehicle. It is not only used for elastically flexibly absorbing impacts up to the first threshold value, thus of an impact speed of, for example, 8 km/h, but also for holding the bumper 5.

Figure 2:
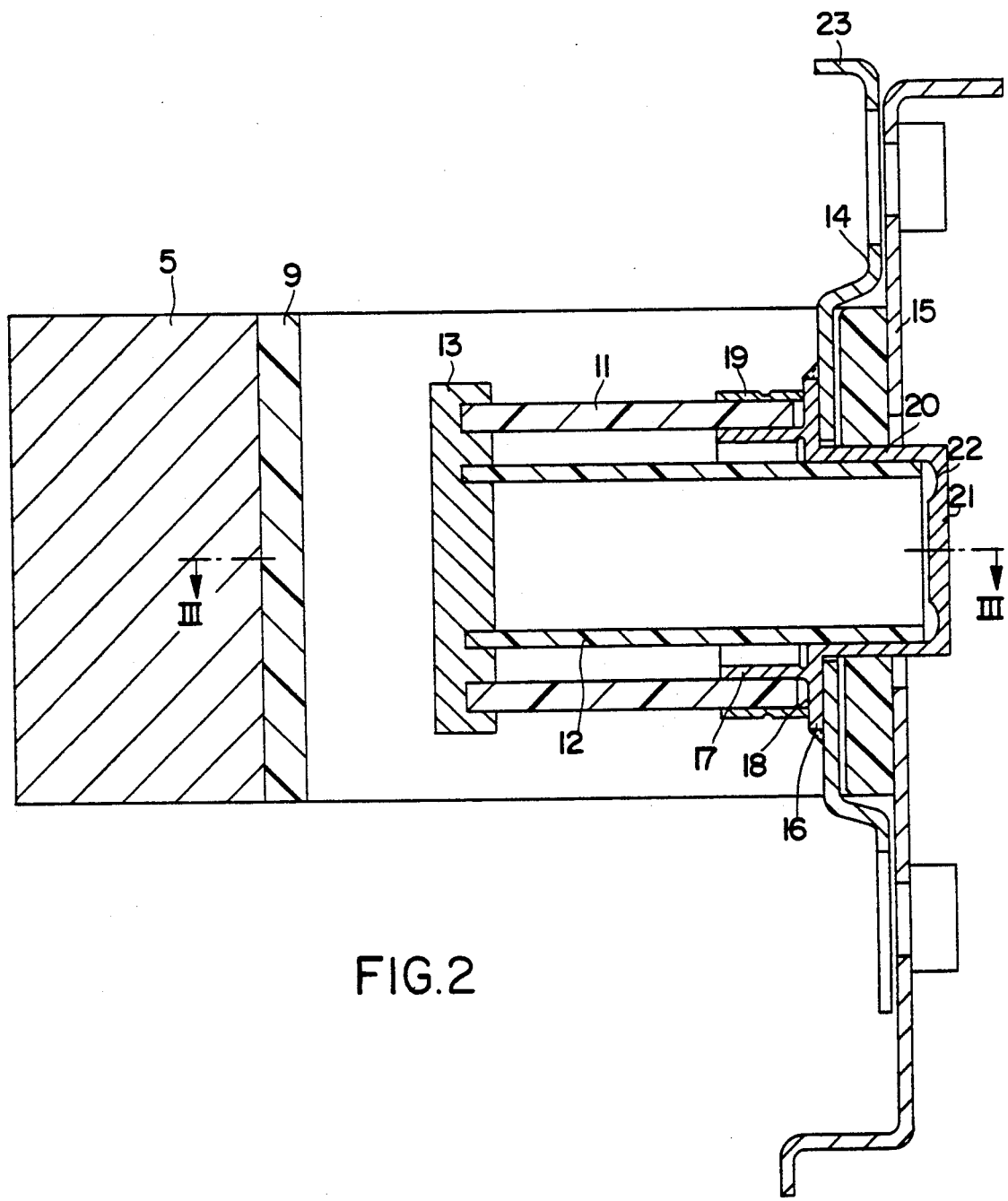
FIG. 2 is a view of a bumper arrangement according to an embodiment of the present invention in a vertical sectional view of a bumper fastening arrangement.
Figure 3:
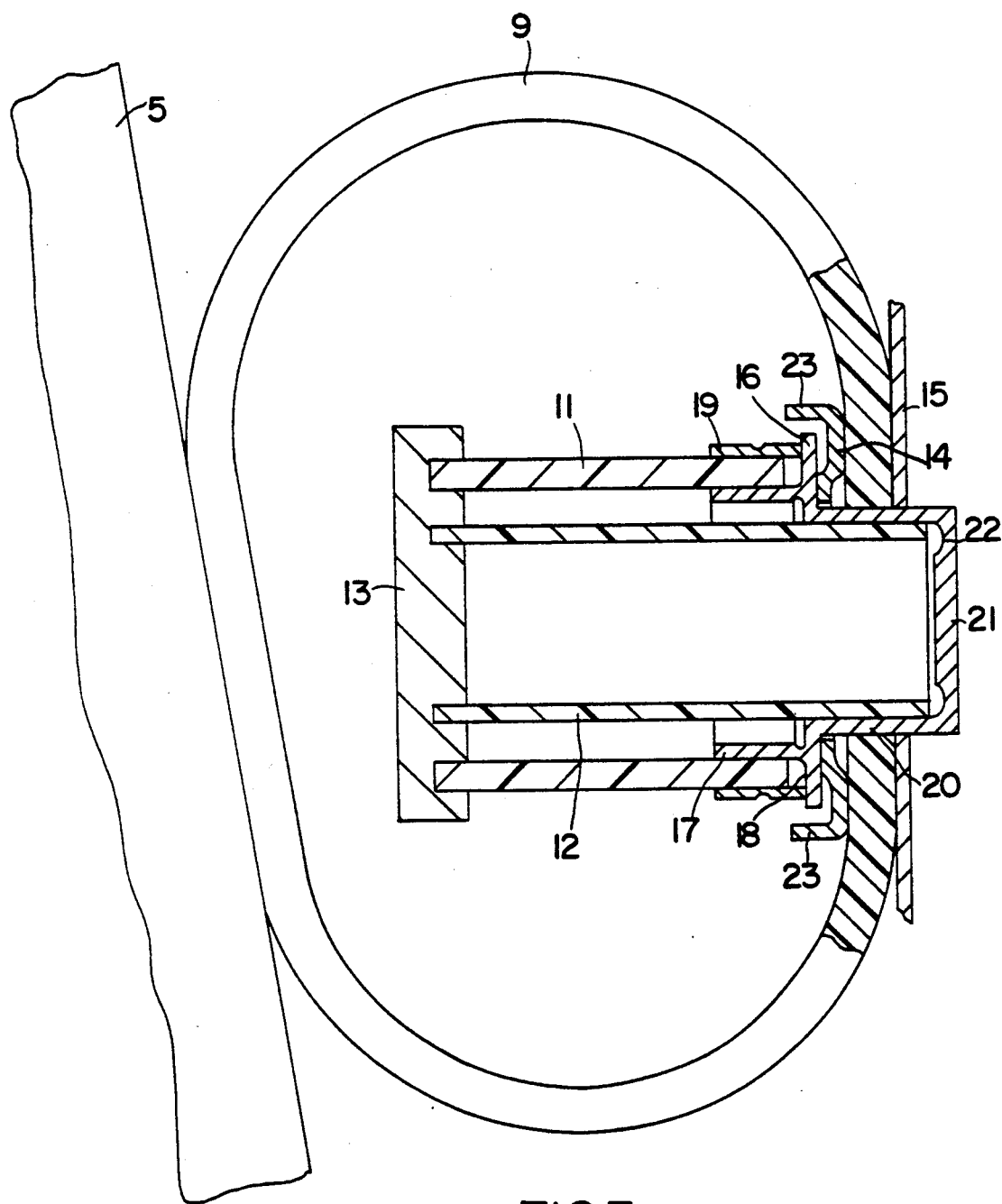
FIG. 3 is a sectional view according to Line III—III of FIG. 2.

An impact absorbing tube device 10 is arranged in the vertical as well as in the horizontal direction at least approximately in the center in the spring element 9. This impact absorbing tube device 10 has an outer impact absorbing tube 11 and an inner impact absorbing tube 12 (FIGS. 2, 3). These are constructed as circular tubes and are arranged coaxially with respect to one another and at a radial distance from one another in such a manner that their longitudinal axis extends at least approximately in the longitudinal direction of the vehicle and thus in the driving direction. The impact absorbing tubes 11, 12 which, each in the required length, were cut off an extruded tube string, consist of at least one fiber composite with fibers which are at least essentially aligned in the longitudinal direction of the tube. Fibers which extend in the circumferential direction are not present in the impact absorbing tube walls. Fiberglass, carbon fibers or aramide fibers can be used as the fibers. As the matrix material, into which the fibers are embedded, for example, at least one material can be used from the group of epoxy resins, polyester resins, phenolic resins or vinyl ester resins, or a thermoplastic material may be used. The outer impact absorbing tube 11 has a larger wall thickness than the inner impact absorbing tube 12. The impact absorbing tubes 11, 12 are dimensioned such that their buckling length is not reached. The ends of the impact absorbing tubes 11, 12, which are in the front in the driving direction, are arranged flush with respect to one another at a distance to the bumper-side part of the spring element 9. By means of these ends, the impact absorbing tubes 11, 12 engage in axial ring grooves of an impact absorbing plate 13 carried by the impact absorbing tubes 11, 12.

By means of their ends, which are in the rear in the driving direction, the impact absorbing tubes 11, 12 are held on a holding element 14 which has an essentially vertical longitudinal course, reaches around the vehicle-body-side part of the spring element 9 from the front, and, by means of two screws, of which one respectively is arranged above and below the spring element 9, is fastened to the front end of one of the side members 15 of the vehicle body 8. The holding element 14 has an annular outer deflecting plate 16, which extends essentially in the radial direction, and a holding ring 17 which points toward the front. The front side of the outer deflecting plate 16 forms an outer deflecting surface 18 with a rounded gradual transition to the exterior side of the holding ring 17 in its radially interior area. The holding ring 17 is enclosed by the rear end of the outer impact absorbing tube 11 pushed onto the holding ring 17, the front face of which has such a distance from the outer deflecting plate 16 that the rear end of the holding ring 17, in which its outer diameter increases because of the gradual transition to the deflecting plate 16 in its direction, is not gripped by the outer impact absorbing tube 11. The rear end of the outer impact absorbing tube 11 is surrounded by a supporting ring 19 which, by means of sustainers, which are narrow in the circumferential direction and are distributed over the circumference, rests against the deflecting surface 18.

By means of a cup-shaped projection 20, the holding element 14 projects through an opening in the vehicle-body-side part of the spring element 9 and into the front end of the side member 15. The front wall of the projection 20 forms an inner deflecting plate 21. In this deflecting plate, on its front side, a surrounding axial groove is provided which forms an inner deflecting surface 22 which, in its radially exterior area, has a rounding which, by means of a gradual transition, connects to the cylindrical wall of the projection 20 as well as to an at least approximately flat front-face area of the inner deflecting surface 22. Another rounding with a gradual transition connects to this area radially father on the inside which ends on the central area of the inner deflecting plate 21 pointing toward the front in the driving direction. The cylindrical wall of the projection 20 encloses the rear end of the inner impact deflecting tube 12, which is pushed into the projection 20 and the front face of which has such a distance from the inner deflecting plate 21 that the inner deflecting surface 22 is not gripped by the inner impact absorbing tube 12.

The impact absorbing tubes 11, 12 may be held on the holding ring 17 or in the projection 20 only by means of a press fit. However, their position may also be fixed by additional devices. An adhesive connection may, for example, be provided.

On both vertical longitudinal sides and on the upper side, the edge of the holding element 14 is bent toward the front by 90° so that a collar 23 is formed which projects toward the front. On both sides of the holding element 14, this collar projects with a lateral distance beyond the outer deflecting plate 16, toward the front.

In the case of an impact, the bumper 5 and the spring elements 9 carrying the bumper 5 first deform elastically. In the case of low impact speeds up to a first threshold value of, for example, 8 km/h, nothing more than this elastic deformation and its regenerating will take place.

In the case of higher impact speeds, which range from the first threshold value of, for example, 8 km/h, and the second threshold value of, for example 15 km/h, after the deforming path is exhausted, for the purely elastic deformation, the interior side of the bumper-side part of the spring element 9 is placed against the impact absorbing plate 13 and shifts it in the direction of the vehicle body 8. In this case, the outer impact absorbing tube 11 is displaced toward the outer deflecting plate 16, and the inner impact absorbing tube 12 is displaced toward the inner deflecting plate 21. When running up against the outer deflecting surface 18, the outer impact absorbing tube 11 is expanded toward the outside, specifically, because the diameter increases in the direction of the vehicle body 8, increasingly as the shifting intensifies. The forces acting in the radial direction lead to a destruction of the outer impact absorbing tube 11. Its fibers are separated from one another, and are deflected from the essentially axial alignment into an essentially radial alignment radially toward the outside, passinq through under the supporting ring 19, which prevents the outer impact absorbing tube 11 from tearing open from the direction of the outer deflecting plate 16 beyond the deflecting area. In the two lateral areas, the fibers, which are deflected toward the outside, strike against the collar 23 at which they are deflected again. The wall of the inner impact absorbing tube 12, by means of the inner deflecting surface 22, is deflected radially toward the inside and subsequently in the axial direction into the space enclosed by the inner impact absorbing tube 12.

During the deflection of the walls of the impact absorbing tubes 11, 12, the position of the fibers with respect to one another is changed. In the case of the outer impact absorbing tube 11, the fibers are separated from one another. In the case of the inner impact absorbing tube 12, the fibers are pushed against one another. In addition to this change of position, there are fiber breakages. In the case of the delaminations and fiber breakages caused by the deformation, kinetic energy is converted and thus the impact is absorbed. Correspondingly, delaminations, intermediate fiber tears, and fiber breakages occur simultaneously in the spring elements 9 so that also the spring elements 9 are destroyed in the case of such an impact and act as impact absorbing elements. During such a destruction of the impact absorbing pipes 11, 12 and of the spring elements 9, the force exercised on the side members 15 of the vehicle body 8 is approximately constant.

After an impact of this type in which the vehicle body 8 was not damaged, the impact absorbing tubes and the spring elements may be removed in a simple manner and may be replaced by new components so that the vehicle will again be in an operable state.

If, in the case of an impact in which the kinetic energy can no longer be absorbed by elastic deformation and the destruction of the spring elements 9 and of the impact absorbing tubes 11, 12, the impact absorbing plate 13 strikes against the holding ring 17, its sustainers will buckle at a desired breaking point provided on its lower edge. The supporting ring 19 can also be compressed by the impact absorbing plate 13. As a result, it is achieved that also the last remainder of the outer impact absorbing tube 11 can be deformed and can contribute to the conversion of the kinetic energy. The inner impact absorbing tube 12 is dimensioned such that, in the case of such an extensive approach of the impact absorbing plate 13 to the holding element 14, the space enclosed by the inner impact absorbing tube 12 along the remaining length is completely filled up by the deflected wall of the inner impact absorbing tube 12. In the case of a higher pressure, additional fiber breakages occur in the tube wall material because of a lacking escape possibility of this tube wall material, while there is more converting of kinetic energy. In this instance, the force exercised on the side members 15 increases such that the vehicle body 8 is also damaged.

Figure 4:
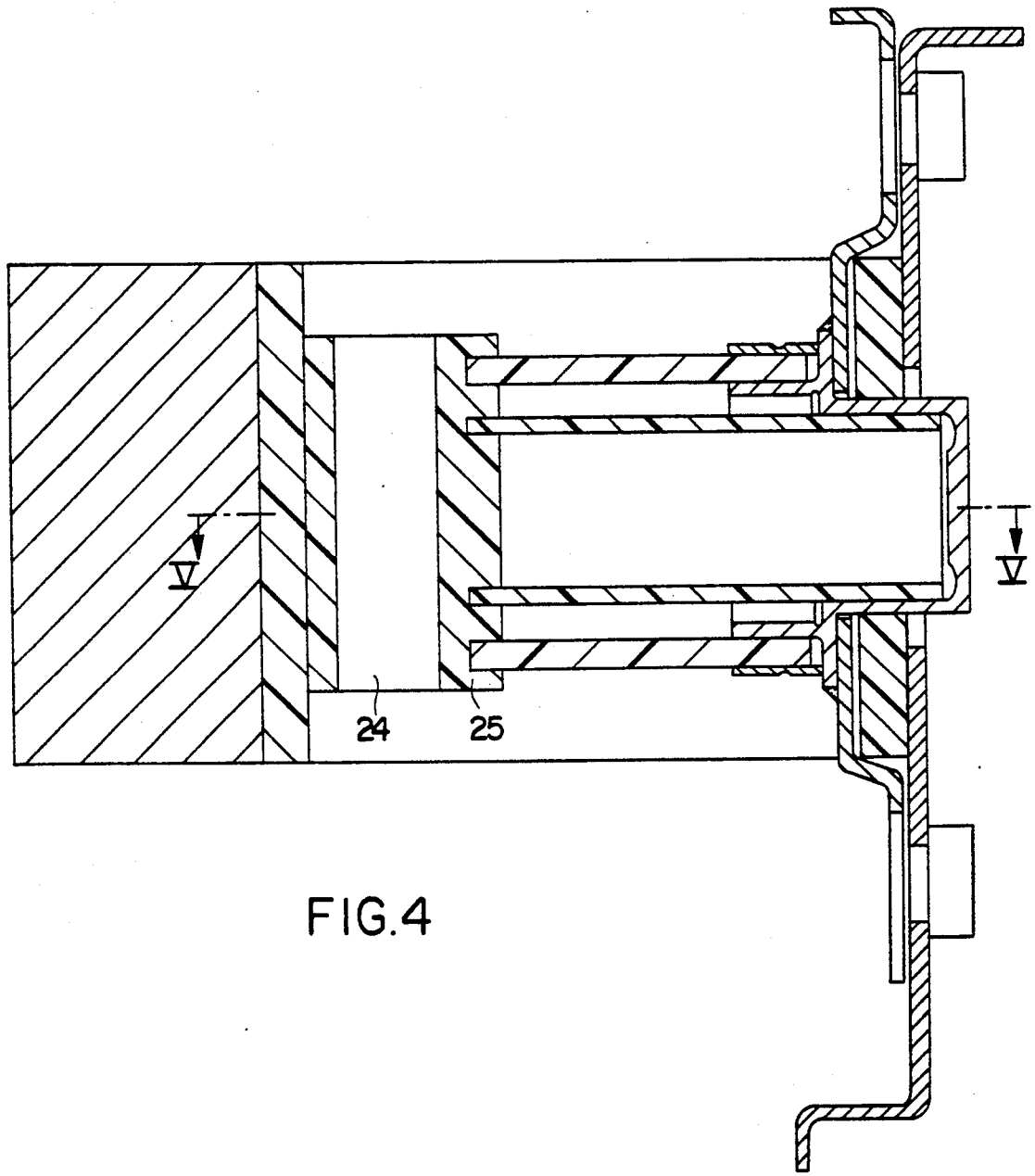
FIG. 4 is a view of another bumper arrangement constructed according to another embodiment of the present invention also in a vertical sectional view of a bumper fastening arrangement.
Figure 5:
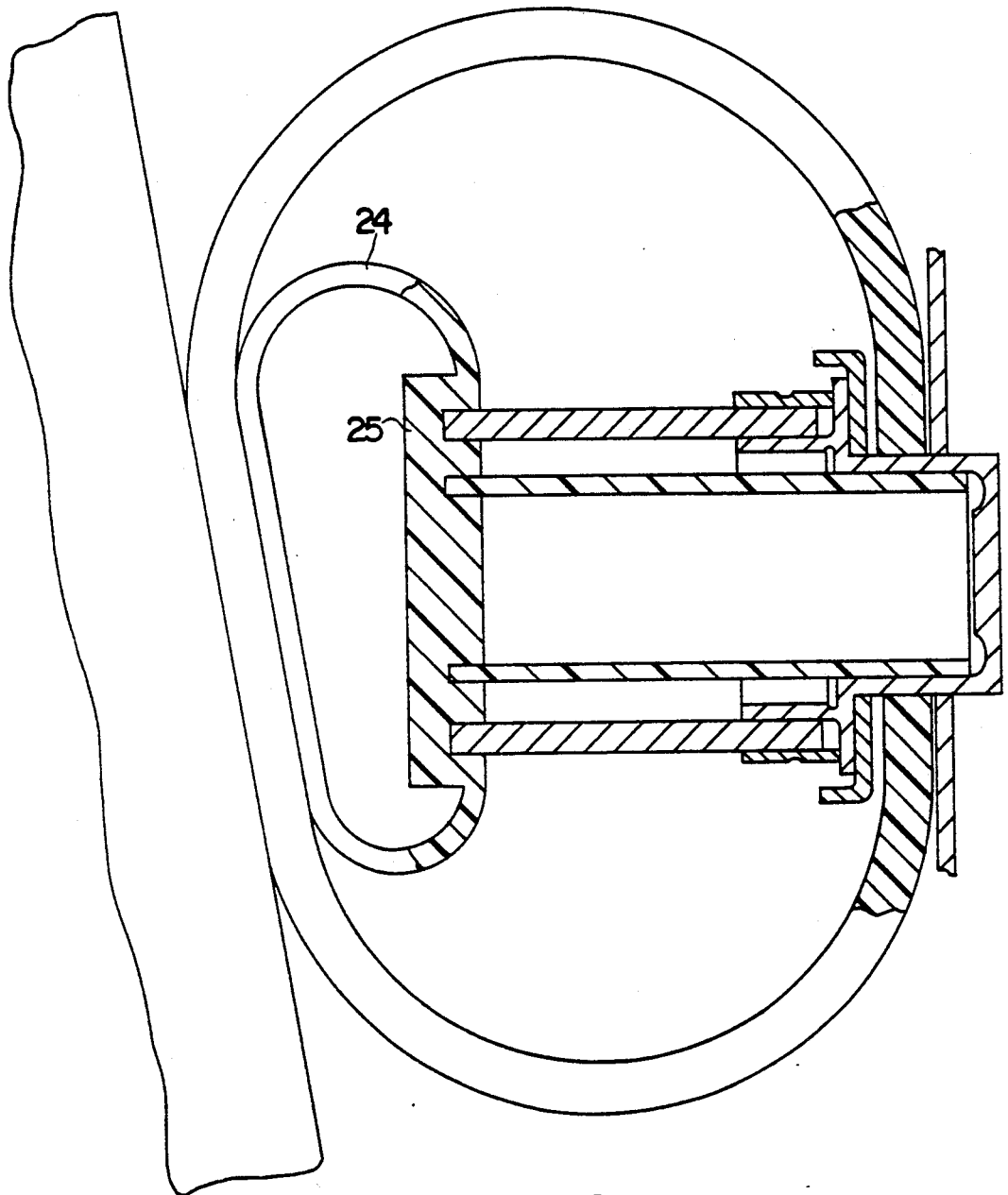
FIG. 5 is a sectional view according to Line V—V of FIG. 4.

The embodiment according to FIGS. 4, 5 differs from that of FIGS. 1 to 3 by the fact that a tension element 24 made of a rubber elastic material is provided between the bumper-side part of the spring element 9 and the impact absorbing tubes 11, 12. The tension element 24 is designed essentially as an oval ring with an upright extending axis and has an impact absorbing plate 25 which receives the front ends of the impact absorbing tubes 11, 12 in axial grooves. The tension element 24 exercises a holding force on the holding tubes 11, 12 in the direction of the deflecting plates. As a result, these are held in their readiness position for a deflection. In the case of an impact which cannot be absorbed only elastically, it is achieved by means of the tension element 24 that the impact absorbing tubes 11, 12 are not stressed by a hard shock, but with a gradually increasing force by the bumper-side part of the spring element 9.

Figure 6:
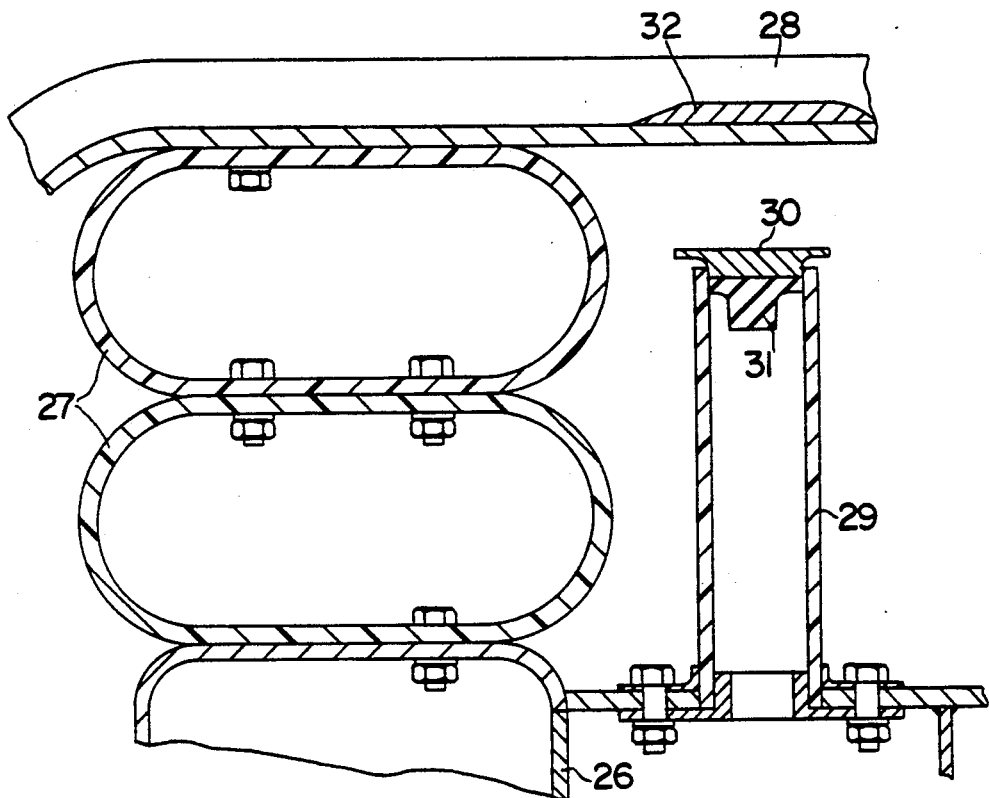
FIG. 6 is a horizontal sectional view of a part of a bumper arrangement constructed according to another embodiment of the present invention.

According to FIG. 6, two identical spring elements 27 made of a fiber-glass-reinforced plastic, which are each designed essentially as an oval ring with an upright extending axis, are arranged in series on the front side of a side member 26 of a vehicle body of a passenger car which is not shown in detail. The body-side spring element 27 is connected with the side member 26. The other spring element 27, which is fastened to the body-side spring element 27, is connected with a bumper 28. Next to the two spring elements 27, an impact absorbing tube 29 is arranged, the axis of which extends essentially in the longitudinal direction of the vehicle and thus into the driving direction, and the construction of which corresponds to that of the impact absorbing tubes 11, 12 of the embodiments according to FIGS. 1 to 5. The impact absorbing pipe 29 therefore also consists of a fiberglass-reinforced plastic material, the fibers of which, however, are not arranged in the circumferential direction as in the case of the spring elements 27 but at least essentially in the longitudinal direction of the tube. The body-side end of the impact absorbing tube 29 is clamped in on the side member 26. The other end of the impact absorbing tube is arranged at a distance from the bumper 28 in the path of its movement. On the bumper-side end, the impact deflecting tube 29 carries a deflecting plate 30 which, by means of a short cylindrical projection, projects into the impact absorbing tube 29 and is glued together with it. The deflecting plate 30 has a rounded deflecting surface which extends from the cylindrical projection to a flat collar surface extending in the radial direction. The outer diameter of the deflecting plate 30 is larger than the outer diameter of the impact absorbing tube 29. Inside the impact absorbing tube 29, the deflecting plate 30 carries a vulcanized-on rubber buffer 31 on the cylindrical projection. A supporting ring, which is not shown, encloses the impact absorbing tube 29 on its bumper-side end area. At the impact point, which is opposite the impact absorbing tube 29, the bumper 28 is provided with a reinforcement 32.

In the case of an impact which leads to a displacement of the bumper 28 which exceeds the extent provided for the elastic compression, the bumper 28 strikes on the deflecting plate 30 and presses it into the impact absorbing tube 29. In this case, the tube wall is deflected radially toward the outside. In the case of an expanding of the impact absorbing tube 29 which is caused in such a manner and of the simultaneously occurring destruction of the spring elements 27, kinetic energy is converted and, as a result, the vehicle body, up to impact speeds which do not exceed the second threshold value, is protected from damage. The supporting ring prevents the impact absorbing tube 29 from ripping open in the axial direction beyond the deflecting area.

The arrangement of an impact absorbing tube next to the spring elements or other flexible fastening devices permits a largely liberal arrangement and dimensioning of the impact absorbing tube. For example, in the case of such an arrangement, the length of the impact absorbing tube is not dependent on the dimensions of the spring element.

The deflection of the wall of an impact absorbing tube influences the extent of the energy conversion. The energy conversion can therefore be influenced not only by the design of the impact absorbing tube but also by the construction of the deflecting surface.

Figure 7:
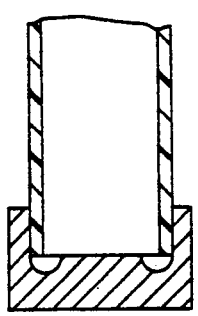
FIGS. 7, 8 and 9 are sectional views of different impact absorbing tube deflection devices.

According to FIG. 7, a deflection of a tube wall is provided toward the inside along a path with a constant curvature, thus along a part of a circular path. In this case, the deflection takes place up to a new alignment of the tube wall in an approximately radial direction.

Figure 8:
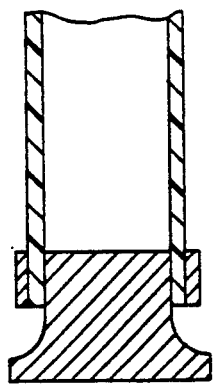

According to FIG. 8, a deflection toward the outside is provided also along a path with a constant curvature, thus along a part of a circular path. The deflection does not take place up to a complete alignment of the deflected wall parts in the radial direction.

Figure 9:
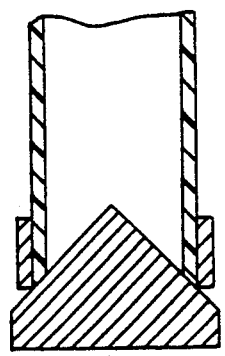

According to FIG. 9, a deflection toward the outside is provided along a sloped surface (cone). A conical deflecting surface can also be used for a deflection toward the inside.

By means of the selection of the curvature or of the sloped-surface incline, a favorable deflection can be determined for the respective application.

It is possible to use a single impact absorbing tube or several impact absorbing tubes, for example, two impact absorbing tubes, as in the embodiments according to FIGS. 1 to 3 and FIGS. 4, 5 or three or four impact absorbing tubes together. The impact absorbing tubes may be arranged inside one another, as in the embodiments according to FIGS. 1 to 3 and FIGS. 4, 5, or may be arranged next to one another.

For an energy conversion that is extensive as possible, it is important that an opening-up of the fiber composite that is as extensive as possible, as well as a large number of yarn breakages are achieved.

A bumper arrangement according to the invention can be used on the forward or on the rearward vehicle end as well as on both vehicle ends. Instead of a deformation on one of the impact absorbing ends, such a deformation may also be provided on both impact absorbing ends.

Although the invention has been described and illustrated in detail, it is to be clearly understood that the same is by way of illustration and example, and it is not to be taken by way of limitation. The spirit and scope of the present invention are to be limited only by the terms of the appended claims.

I claim:

1. A bumper arrangement for a motor vehicle having a vehicle body, comprising:
   a bumper;
   at least one fastening device by which said bumper is held on the vehicle body at a changeable distance, and which can essentially regenerate after said distance changes within a first distance area;
   impact absorbing tubes which act as supporting devices for distance changes within a second distance area that is nearer to the vehicle body than the first distance area, and in the event of a pressure load in a longitudinal direction of the tube said impact absorbing tubes acting as supporting devices and being unable to regenerate, said impact absorbing tubes having tube walls, said tube walls being destroyed on a tube end side in the event of a pressure load and the material of the tube wall being deflected in a transverse direction;
   wherein said impact absorbing tubes are parts separate from the at least one fastening device and consist of at least one fiber composite, with fibers of the fiber composite arranged at least essentially in the longitudinal direction of the tube.

2. A bumper arrangement according to claim 1, wherein the longitudinal axis of the impact absorbing tubes extends at least approximately in the longitudinal direction of the vehicle.

3. A bumper arrangement according to claim 1, wherein the impact absorbing tubes are manufactured from extruded profiles.

4. A bumper arrangement according to claim 1, wherein at least one of fiberglass, carbon fibers or aramide fibers are used as the fibers of the impact absorbing tubes.

5. A bumper arrangement according to claim 4, wherein at least one material from the group of epoxy resins, polyester resins, phenolic resins or vinyl ester resins is used as a matrix material of the impact absorbing tubes.

6. A bumper arrangement according to claim 4, wherein at least one thermoplastic material is used as a matrix material of the impact absorbing tubes.

7. A bumper arrangement according to claim 1, further comprising a deflecting plate, which has a deflecting surface, is arranged at least on one of the ends of each impact absorbing tube.

8. A bumper arrangement according to claim 7, wherein the deflecting surface is rounded.

9. A bumper arrangement according to claim 7, wherein the deflecting surface includes means for deflecting the tube wall toward the inside.

10. A bumper arrangement according to claim 9, wherein the at least one part of the tube wall is deflectable by at least approximately 180°.

11. A bumper arrangement according to claim 7, wherein the deflecting surface includes means for deflecting the tube wall toward the outside, and further comprising a supporting ring which encloses each of the impact absorbing tubes in the proximity of the deflecting end.

12. A bumper arrangement according to claim 11, wherein the at least one part of the tube wall is deflectable by at least approximately 180°.

13. A bumper arrangement according to claim 1, wherein impact absorbing tubes are arranged inside one another.

14. A bumper arrangement according to claim 13, wherein impact absorbing tubes are arranged coaxially with respect to one another.

15. A bumper arrangement according to claim 14, wherein the impact absorbing tubes are separated by a distance in the transverse direction that is provided all around between the impact absorbing tubes which are arranged coaxially with respect to one another.

16. A bumper arrangement according to claim 13, wherein at least one tube wall is deflectable toward the inside as well as at least one tube wall is deflectable toward the outside.

17. A bumper arrangement according to claim 1, wherein the fastening device comprises at least one spring element made of a fiber-reinforced plastic material which are essentially ring-shaped, can regenerate elastically in the first distance area, and act as impact absorbing elements while being destroyed, in the event of distance reductions in the second distance area, while essentially not being able to regenerate in the second distance area.

18. A bumper arrangement according to claim 17, wherein at least one impact absorbing tube is arranged within the at least one spring element.

19. A bumper arrangement according to claim 18, wherein the at least one impact absorbing tube is held in the at least one spring element by at least one elastic tension element.

20. A bumper arrangement according to claim 17, wherein the impact absorbing tubes are arranged outside the at least one spring element and in the proximity of the at least one spring element.

* * * * *